Patented May 19, 1931

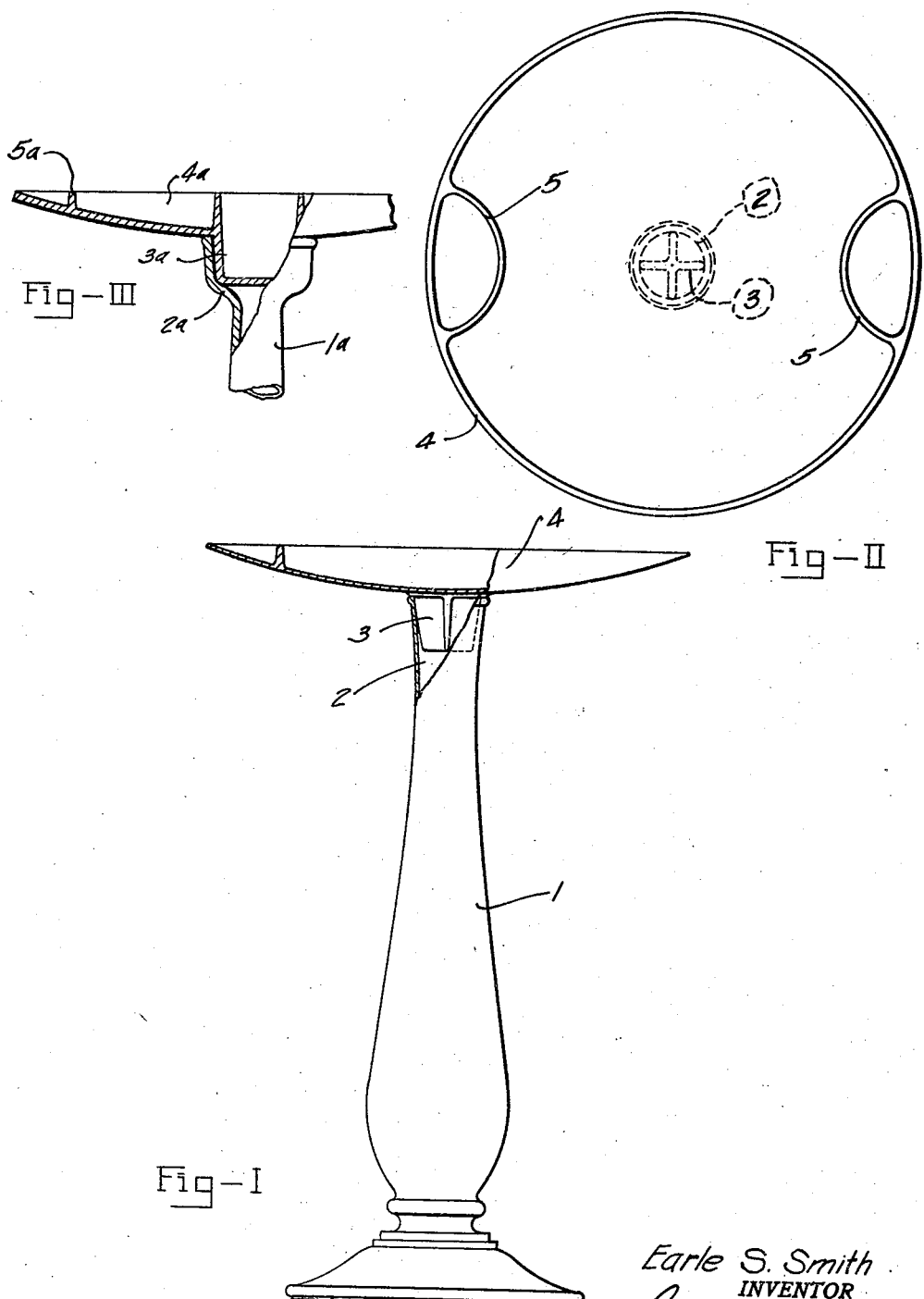

1,806,123

UNITED STATES PATENT OFFICE

EARLE S. SMITH, OF TOLEDO, OHIO, ASSIGNOR TO THE TOLEDO PORCELAIN ENAMEL PRODUCTS COMPANY, OF TOLEDO, OHIO, A CORPORATION OF OHIO

BIRD BATH

Application filed March 20, 1929. Serial No. 348,406.

This invention relates to improvements in "bird baths" and particularly to bird baths made of iron castings, which may be porcelain enameled to harmonize with their surroundings.

Bird baths, aside from their ornamental value, fulfill a humane purpose, especially during hot, arid summer months by supplying water to birds. The presence of birds on lawns and in gardens is eagerly sought. In a neighborhood where a large number of bird baths are to be found, the birds do not congregate at any particular one, unless added attractions are provided.

The principal object of my invention is the provision of a bird bath having additional lure.

Another object is the provision of a bird bath having receptacles for food incorporated in its construction.

A still further object is the provision of a bird bath in which the water may be shaded by a living plant.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view, a portion being broken away, of a bird bath incorporating my invention.

Figure II is a plan view thereof; and

Figure III is a fragmentary view, partly in section, of an alternate design, incorporating additional improvements.

A tubular column 1 is provided with a circular opening 2 which is adapted to receive a cruciform extension 3 of the water pan 4. The water pan 4 is provided with a plurality of walls 5, cast integrally with the pan body. These walls or dams, are disposed along the periphery of the pan body and form dry receptacles in which small seeds or other bird food may be placed.

As shown in the alternate construction of Figure III, I have for the purpose of adding to the ornamental value of the device and for retarding evaporation of the water provided the water pan 4a with a centrally disposed receptacle 3a. This receptacle is designed to receive a living plant, preferably a plant having large leaves, such as certain plants of the genus "*Begonia*." These plants are ideally suited to shade the water, which reduces the evaporation considerably. The column 1a is provided with an enlarged portion 2a adapted to receive the receptacle 3a.

I have found that bird baths incorporating the hereinbefore described advantages are greatly preferred by birds of all species, they are attracted by the combination of water, feed and shade which also encourages them to build their nests in the vicinity.

Having described my invention, I claim:

1. In a bird bath, in combination, a vertically disposed pedestal having an opening in its upper end, a removable water pan having a projection depending from its bottom, said opening in said column being adapted to receive said projection on said pan; and a receptacle formed by an integral partition in said pan adjacent to its periphery adapted to receive bird food.

2. In a bird bath, in combination, a vertically disposed pedestal having an opening in its upper end, a removable water pan having a projection depending from its bottom, said opening in said column being adapted to receive said projection on said pan; and a plurality of receptacles formed by integral partitions in said pan adjacent to its periphery adapted to receive bird food.

3. In a bird bath, in combination, a vertically disposed hollow column, a removable water pan having a centrally located receptacle, said receptacle extending below the bottom surface of said water pan and being adapted to be received by said hollow column, said receptacle being surrounded by integral walls extending upwardly from the upper surface of said water pan, and a plurality of integral partitions extending upwardly, disposed around the periphery of said water pan, forming receptacles for the reception of bird food.

4. A bird bath having a receptacle for bird food formed by a partition located adjacent its periphery.

5. A bird bath having a plurality of receptacles for bird food formed by integral curved partitions located adjacent its periphery.

6. A bird bath having a receptacle for bird food formed by a partition located adjacent its periphery and having a receptacle for a plant formed at its center.

EARLE S. SMITH.